(12) United States Patent
Deguchi et al.

(10) Patent No.: US 7,428,125 B2
(45) Date of Patent: Sep. 23, 2008

(54) ROTATING DISK STORAGE DEVICE AND PIVOT BEARING

(75) Inventors: Takaaki Deguchi, Kanagawa (JP); Shingo Tsuda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 450 days.

(21) Appl. No.: 11/090,350

(22) Filed: Mar. 24, 2005

(65) Prior Publication Data

US 2005/0213255 A1     Sep. 29, 2005

(30) Foreign Application Priority Data

Mar. 24, 2004   (JP)   ............... 2004-086568

(51) Int. Cl.
*G11B 5/48*   (2006.01)
*H02K 5/16*   (2006.01)
*G11B 5/55*   (2006.01)

(52) U.S. Cl. ............... 360/265.2; 360/265; 360/265.1; 360/265.3; 360/265.4; 310/90

(58) Field of Classification Search ... 360/265.2–265.7
See application file for complete search history.

(56) References Cited

U.S. PATENT DOCUMENTS

| | | | | |
|---|---|---|---|---|
| 2,877,068 A | * | 3/1959 | Schaefer | 384/537 |
| 4,698,709 A | * | 10/1987 | Ihlenburg et al. | 360/265.6 |
| 4,713,703 A | * | 12/1987 | Asano | 360/99.08 |
| 4,754,353 A | * | 6/1988 | Levy | 360/265.6 |
| 4,796,122 A | * | 1/1989 | Levy et al. | 360/98.01 |
| 4,814,652 A | * | 3/1989 | Wright | 360/98.07 |
| 4,979,063 A | * | 12/1990 | Ghose et al. | 360/264.3 |

(Continued)

FOREIGN PATENT DOCUMENTS

JP          05-205413          8/1993

(Continued)

*Primary Examiner*—Angel Castro
*Assistant Examiner*—Christopher R. Magee
(74) *Attorney, Agent, or Firm*—Townsend and Townsend and Crew LLP; Duke Amaniampong

(57) ABSTRACT

Embodiments of the invention position accurately an actuator head suspension assembly (AHSA) relative to a magnetic disk without using any positioning jig, as achieved through a simple structure and involving no increase in manufacturing, and to prevent the AHSA from being charge. In one embodiment, a conductive AHSA includes a pivot opening formed to provide a step at an adjoining portion of two holes having different hole diameters from each other. A pivot bearing assembly includes a first conductive roller bearing and a second conductive roller bearing. The first and the second roller bearings include outer races and inner races with balls interposed between the outer races and the inner races. The first and the second roller bearings are disposed in tandem to achieve the following arrangements. Specifically, the outer race of the second roller bearing fits into a hole having a larger hole diameter in the pivot opening, while the outer race of the first roller bearing fits into hole having a smaller hole diameter in the pivot opening. There is interposed a conductive spacer between the first and the second roller bearings. The spacer abuts on the step in the pivot opening. A conductive pivot shaft is inserted in each of the inner races of the first and the second roller bearings disposed in tandem in the pivot opening.

18 Claims, 4 Drawing Sheets

U.S. PATENT DOCUMENTS

| | | | | |
|---|---|---|---|---|
| 4,984,115 A | * | 1/1991 | Takahashi et al. | 360/265.6 |
| 5,041,934 A | * | 8/1991 | Stefansky | 360/264.7 |
| 5,109,310 A | * | 4/1992 | Ohkjita et al. | 360/264.3 |
| 5,134,532 A | * | 7/1992 | Svendsen et al. | 360/264.4 |
| 5,301,078 A | * | 4/1994 | Makino et al. | 360/265.7 |
| 5,473,489 A | * | 12/1995 | Sanada | 360/265.6 |
| 5,482,381 A | * | 1/1996 | Krum et al. | 384/480 |
| 5,557,490 A | * | 9/1996 | Jabbari | 360/265.2 |
| 5,579,190 A | * | 11/1996 | Mastache et al. | 360/265.6 |
| 5,666,243 A | * | 9/1997 | Brent | 360/265.9 |
| 5,805,385 A | * | 9/1998 | Koriyama | 360/265.2 |
| 5,864,441 A | * | 1/1999 | Coffey et al. | 360/97.01 |
| 5,999,373 A | * | 12/1999 | Allsup et al. | 360/265.6 |
| 6,053,638 A | * | 4/2000 | Muraki et al. | 384/513 |
| 6,631,053 B1 | * | 10/2003 | Chew | 360/265.6 |
| 6,634,103 B2 | * | 10/2003 | Muraki et al. | 29/898.07 |
| 2002/0006015 A1 | * | 1/2002 | Mouri et al. | 360/265.2 |
| 2002/0118491 A1 | * | 8/2002 | Koyama | 360/265.7 |

FOREIGN PATENT DOCUMENTS

| | | |
|---|---|---|
| JP | 2000074052 A * | 3/2000 |
| JP | 2000-036163 | 2/2002 |
| JP | 2003-077237 | 3/2003 |
| JP | 2003-239985 | 8/2003 |

* cited by examiner (a)

(b)

PRIOR ART

ROTATING DISK STORAGE DEVICE AND PIVOT BEARING

CROSS-REFERENCES TO RELATED APPLICATIONS

This application claims priority from Japanese Patent Application No. JP2004-086568, filed Mar. 24, 2004, the entire disclosure of which is incorporated herein by reference.

BACKGROUND OF THE INVENTION

The present invention generally relates to a rotating disk storage device and a pivot bearing assembly. The invention relates more particularly to a pivot bearing assembly that pivotably supports, within a disk enclosure, an actuator head suspension assembly for moving a magnetic head above a magnetic disk. The invention relates also to a rotating disk storage device using the pivot bearing assembly.

A magnetic disk device as a rotating disk storage device includes a magnetic disk, an actuator head suspension assembly, and a control unit. The magnetic disk has a magnetic layer formed on a surface thereof and spins about a spindle shaft. The control unit controls data read/write operations and operations of the actuator head suspension assembly.

The actuator head suspension assembly is mounted with a magnetic head for reading and writing data and a slider for providing an air bearing surface (ABS). The actuator head suspension assembly also includes a carriage arm that pivots about a pivot shaft.

A coil support is formed in part of the carriage arm. The coil support holds a voice coil. The coil support is disposed in a magnetic field of a voice coil magnet. The voice coil magnet and the voice coil form a voice coil motor (VCM) that generates a driving force for pivotally moving the carriage arm.

When the magnetic disk spins, a surface air flow forms an air bearing. This gives the air bearing surface of the slider an ascending force, causing the slider to fly just above the magnetic disk surface. The driving force of the voice coil motor causes the slider to pivot about the pivot shaft substantially radially relative to the magnetic disk. While pivotally moving, the slider maintains a position slightly above the magnetic disk surface. The slider thus allows the magnetic head to position at a desired radial location on the disk surface for reading/writing data.

The actuator head suspension assembly of the magnetic disk device must be accurately controlled for positioning the magnetic head that reads data from and writes data onto the magnetic disk. The actuator head suspension assembly is mounted on the pivot shaft by way of a pivot bearing assembly that pivotally moves accurately about the pivot shaft.

The following bearing assembly is proposed as a pivot bearing assembly achieving the aforementioned purpose. This specific bearing assembly includes a body, a bearing head, and a central recess (see, for example, Japanese Patent Laid-open No. 2000-36163 (pp. 4 to 5; FIGS. 3 to 5)). The body has a cylindrical portion having a first outer diameter. The bearing head has a cylindrical portion having a second outer diameter that is relatively larger than the first outer diameter of the body. The central recess is defined between the body and the bearing head. This bearing assembly is mounted to a pivot bearing housing of a shoulder structure having a first nominal inner diameter and a second nominal inner diameter that is smaller than the first nominal inner diameter.

Another type of the pivot bearing assembly is proposed. This pivot bearing assembly is arranged as follows. Specifically, there is provided a two-stage shaft having a large-diameter shaft portion and a small-diameter shaft portion. An inner raceway for a lower row is directly formed on an outer periphery of the large-diameter shaft portion. An outer raceway is directly formed on an inner peripheral surface of a sleeve outer race that surrounds the large-diameter shaft portion of the two-stage shaft. A plurality of balls for the lower row is disposed between the inner raceway and the outer raceway. A ball bearing thus formed has a lower end surface of the outer race pressed tightly up against an upper end surface of the sleeve outer race. The inner race of the ball bearing is secured to the small-diameter shaft portion with an appropriate preload applied from an upper end surface side of the inner race (see, for example, Japanese Patent Laid-open No. 2003-77237 (pp. 3 and 4; FIGS. 2 to 4)).

Still another type of the pivot bearing assembly is proposed. Referring to FIG. 6, a pivot unit 50 is proposed (see, e.g., Japanese Patent Laid-open No. 2003-239985 (p. 3; FIG. 1)). The pivot unit 50 includes a rotary shaft 51, and a housing 52 rotatably mounted thereto by way of two radial ball bearings 50A, 50B disposed vertically at upper and lower positions of the rotary shaft 51. A protrusion 52a is formed on an inner periphery of the housing 52. The protrusion 52a keeps the two radial ball bearings 50A, 50B away from each other vertically.

A further type of the pivot bearing assembly is proposed (see, e.g., Japanese Patent Laid-open No. Hei 5-205413 (p. 6; FIG. 3)). This pivot mechanism includes the following components: a pivot shaft; a lower ball bearing assembly and an upper ball bearing assembly that are first mounted to the pivot shaft and then secured in position; and a steel sleeve having a central hole therein, in which the lower ball bearing assembly and the upper ball bearing assembly are disposed and secured in position. For each of the lower ball bearing assembly and the upper ball bearing assembly, an inner race has been preloaded toward each other and an outer race has been preloaded away from each other.

A rotation transmission apparatus is also proposed (see, e.g., Japanese Patent Laid-open No. Hei 5-149353). In this apparatus, a plurality of roller bearings incorporating rolling elements of varying pitch circle diameters is disposed in tandem. A retainer of each of the rolling elements of the roller bearings is connected to each other.

BRIEF SUMMARY OF THE INVENTION

The pivot bearing assembly as described in Japanese Patent Laid-open No. 2000-36163 is assembled as follows. Specifically, the bearing assembly is aligned preliminarily with the pivot bearing housing having a shoulder structure. The body of the bearing assembly is press-fit to a second nominal inner diameter of the pivot bearing housing, while the bearing head of the bearing assembly is press-fit to a first nominal inner diameter of the pivot bearing housing, respectively, independently of each other. This addresses the problem of an unevenly deformed bearing housing occurring as a result of misalignment in assembling the bearing assembly. Such an arrangement of the bearing assembly, however, constitutes an outer race that integrates the body of the bearing assembly, the central recess, and the bearing head. This precludes use of a commercially available roller ball bearing having the most typical shape and arrangement, such as a deep groove ball bearing and the like. In addition, the patent reference fails to describe a specific method for applying preload in order to increase bearing stiffness or eliminate bearing clearance.

In accordance with the pivot bearing assembly as described in Japanese Patent Laid-open No. 2003-77237, it is necessary to machine the pivot shaft to provide the inner raceway that serves as a groove for letting balls roll. It is also necessary to machine the pivot shaft into the two-stage shaft. This precludes use of a commercially available roller ball bearing having the most typical shape and arrangement, such as a deep groove ball bearing and the like.

In accordance with the pivot bearing assembly as described in Japanese Patent Laid-open No. 2003-239985, the pivot unit 50 must be manufactured so that a carriage 60 rotates accurately about the rotary shaft 51. Achieving this purpose requires an increased machining cost. This is because requirements for more stringent machining accuracy in inner and outer walls of the housing 52 involve an increased volume of machining. Further, an outer periphery of the housing 52 of the pivot unit 50 and a pivot unit insertion hole 60*a* in the carriage 60 are of a straight configuration. To position the carriage 60 relative to the rotary shaft 51 in a height direction, use of a positioning jig is mandatory to achieve high accuracy. To secure these parts in position after the positioning, it is further necessary to machine the carriage 60 and the housing 52 of the pivot unit 50 for screwing. Moreover, if an adhesive is used to secure the carriage 60 and the housing 52 of the pivot unit 50, it becomes difficult to ensure electric conductivity between the carriage 60 and the pivot unit 50. Screws or conductive adhesives may be used to provide electric conductivity, but that leads to an increased manufacturing cost.

In accordance with the pivot bearing assembly as described in Japanese Patent Laid-open No. Hei 5-205413, an outer periphery of the steel sleeve of the pivot mechanism and a steel sleeve insertion hole in the actuator body are of a straight configuration. To position the actuator body relative to the pivot shaft in a height direction, use of a positioning jig is mandatory to achieve high accuracy. To secure these parts in position after the positioning, it is further necessary to machine the actuator body and the steel sleeve of the pivot mechanism for screwing. Moreover, if an adhesive is used to secure the actuator body and the steel sleeve of the pivot mechanism, it becomes difficult to ensure electric conductivity between the actuator body and the steel sleeve. Conductive adhesives may be used to provide eliminate this problem, but that leads to an increased manufacturing cost.

Japanese Patent Laid-open No. Hei 5-149353 discloses the rotation transmission apparatus having the following arrangement. Specifically, a plurality of roller bearings incorporating rolling elements of varying pitch circle diameters is disposed in tandem. A retainer of each of the rolling elements of the roller bearings is connected to each other. The arrangement is applied to a motor vehicle for connecting or disconnecting a driving torque from a drive axle to a wheel in the vehicle. Should the arrangement be applied to the pivot bearing in the magnetic disk device, it is not possible to derive a simple technique for positioning in the height direction the actuator head suspension assembly, for which the slider, to which the magnetic head is mounted, and the carriage arm pivoting about the pivot shaft, are provided.

It is therefore a feature of the present invention to provide a rotating disk storage device and a pivot bearing assembly that can achieve the following purposes. Specifically, the rotating disk storage device and the pivot bearing assembly offer a simple structure, with which a relative positional relationship between the actuator head suspension assembly and the rotating disk recording medium can be accurately established without using any positioning jig. The rotating disk storage device and the pivot bearing assembly can further prevent the actuator head suspension assembly from being charged.

A rotating disk storage device according to a first embodiment of the present invention includes a rotating disk recording medium, an actuator head suspension assembly, and a pivot bearing assembly. The actuator head suspension assembly is mounted with a head. The head pivotally moves about a pivot shaft so as to move over a surface of the rotating disk recording medium. The actuator head suspension assembly is provided with a pivot opening that includes a step formed by holes of different hole diameters at an adjoining portion thereof. The pivot bearing assembly includes a first roller bearing and a second roller bearing. Each of the first and the second roller bearing includes an outer race and an inner race with rolling elements interposed therebetween. When the first and the second roller bearing are inserted in the pivot opening in the actuator head suspension assembly, the outer race of one roller bearing fits into a hole with the greater hole diameter of the pivot opening, while the outer race of the other roller bearing fits into a hole with the smaller hole diameter of the pivot opening. There is interposed a spacer between the first and the second roller bearing. The spacer is disposed so as to abut on the outer race only of each of the first and the second roller bearing. The spacer also abuts on the step in the pivot opening. A pivot shaft is inserted in the inner race of each of the first and the second roller bearing disposed inside the pivot opening.

In the first embodiment, the pivot bearing assembly, which has previously been assembled, is inserted and secured in position in the pivot opening in the actuator head suspension assembly. The pivot bearing assembly is assembled as follows. Specifically, the second roller bearing having the outer race with the smaller outer diameter is first mounted and secured to the pivot shaft. The spacer and the first roller bearing are then mounted to the pivot shaft as follows. Specifically, the spacer is placed on a top surface of the outer race of the second roller bearing. The outer race of the first roller bearing is then placed on a top surface of the spacer. The first roller bearing is finally secured to the pivot shaft with the inner race of the first roller bearing pressed from the side of an upper surface thereof. Assembling the pivot bearing assembly in the manner as described above results in relative positions of the bearings being fixed with the two outer races integrated by the spacer. This condition is referred to as fixed position preload. The fixed position preload causes a contact point between the outer/inner race and the rolling element to receive a compression force at all times. This helps enhance stiffness of each roller bearing and minimize bearing clearance.

When the pivot bearing assembly assembled as described above is inserted into pivot opening in the actuator head suspension assembly, the spacer is brought into contact with the step formed in the pivot opening. The step can then be used as a reference point for positioning in a vertical direction. Positioning in the vertical direction can therefore be made accurately without using any positioning jig.

A rotating disk storage device according to a second embodiment of the present invention includes a disk enclosure, a rotating disk recording medium, an actuator head suspension assembly, and a pivot bearing assembly. The disk enclosure includes a base and a cover. The rotating disk recording medium is rotatably supported by the base and driven by a spindle motor. The actuator head suspension assembly is mounted with a head. The head pivotally moves about a pivot shaft so as to move over a surface of the rotating disk recording medium. The actuator head suspension assembly is provided with a pivot opening that includes a step formed at an adjoining portion by holes of different hole diameters. The pivot bearing assembly includes a first roller bearing and a second roller bearing. Each of the first and the second roller bearing offers conductivity and includes an outer race and an inner race with rolling elements interposed therebetween. When the first and the second roller bearing are inserted in the pivot opening in the actuator head suspension assembly, the outer race of one roller bearing fits into a hole with the greater hole diameter of the pivot opening, while the outer race of the other roller bearing fits into a hole with the smaller hole diameter of the pivot opening. There is interposed a conductive spacer between the first and the second roller bearing. The conductive spacer is brought into contact with the step in the pivot opening. A conductive pivot shaft is inserted in the inner race of each of the first and the second roller bearing disposed inside the pivot opening. The pivot shaft is thereby electrically conductive relative to the disk enclosure. An outer periphery of the pivot bearing assembly is secured to an inner periphery of the pivot opening by an adhesive.

In the second embodiment, the pivot bearing assembly as assembled according to the steps as described for the first embodiment is inserted into the pivot opening in the actuator head suspension assembly. The spacer of the pivot bearing assembly can then be brought into contact with the step in the pivot opening. Electric conductivity can then be secured even if the outer periphery of the pivot bearing assembly is bonded to the inner periphery of the pivot opening using a nonconductive adhesive.

A rotating disk storage device according to a third embodiment of the present invention includes a first roller bearing, a second roller bearing, and a pivot shaft. Each of the first and the second roller bearing includes an outer race and an inner race. There are disposed rolling elements between the outer and inner races. The first and the second roller bearing are inserted to the pivot shaft so as to be disposed in tandem. Each of the inner races of the first and the second roller bearing is secured onto the pivot shaft. There is interposed a spacer between the first and the second roller bearing. The spacer abuts on each of the outer races of the first and the second roller bearing.

In the third embodiment, the roller bearings can be preloaded without having to use a sleeve for accurately fitting into the pivot opening in the actuator head suspension assembly.

The present invention can provide a rotating disk storage device that has the following structure. The structure is effective when an actuator head suspension assembly is assembled into a rotating disk storage device, such as a magnetic disk device or the like. The structure, specifically, allows the actuator head suspension assembly and the rotating disk recording medium to be accurately positioned relative to each other without using any positioning jig.

The present invention can also provide a rotating disk storage device that achieves the following purpose. Specifically, even if the pivot bearing assembly is bonded to the pivot opening in the actuator head suspension assembly using a nonconductive adhesive, electric conductivity can be provided between these assemblies.

Further, the present invention can provide a rotating disk storage device and a pivot bearing assembly that have the following structure. Specifically, the structure can give preload to roller bearings even without using any sleeve for accurately fitting the bearings into the pivot opening in the actuator head suspension assembly.

DETAILED DESCRIPTION OF THE INVENTION

Figure 1:
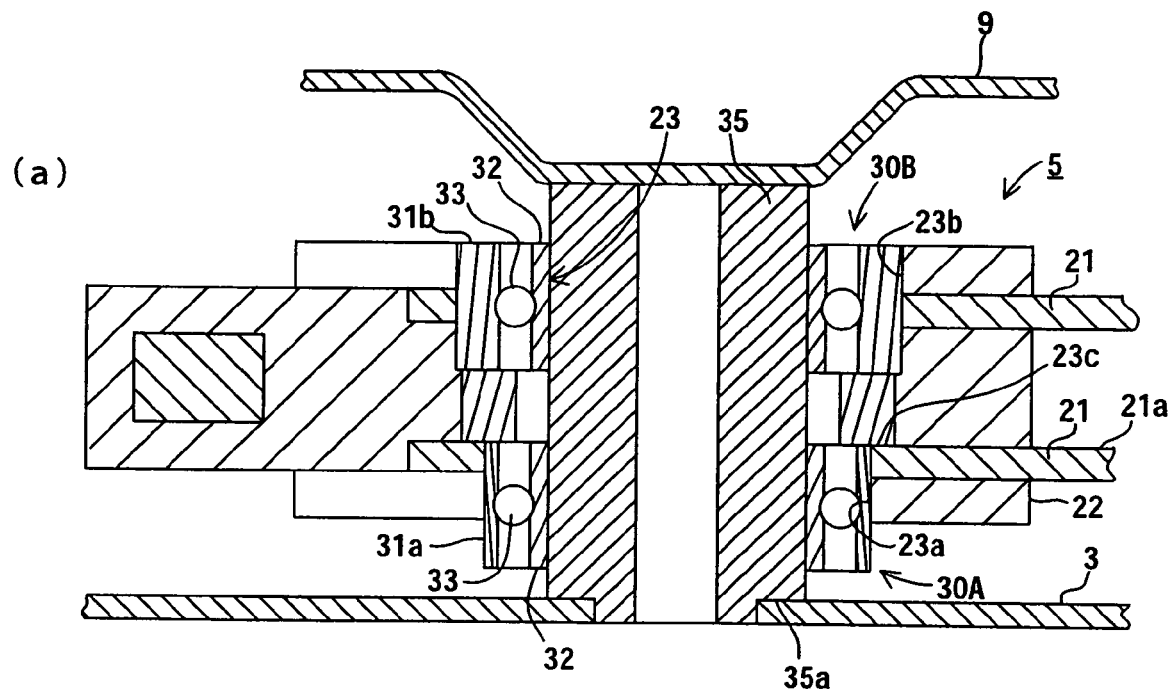
FIGS. 1($a$) and 1($b$) are views showing the construction of a pivot bearing assembly of a rotating disk storage device according to an embodiment of the present invention.
Figure 1:
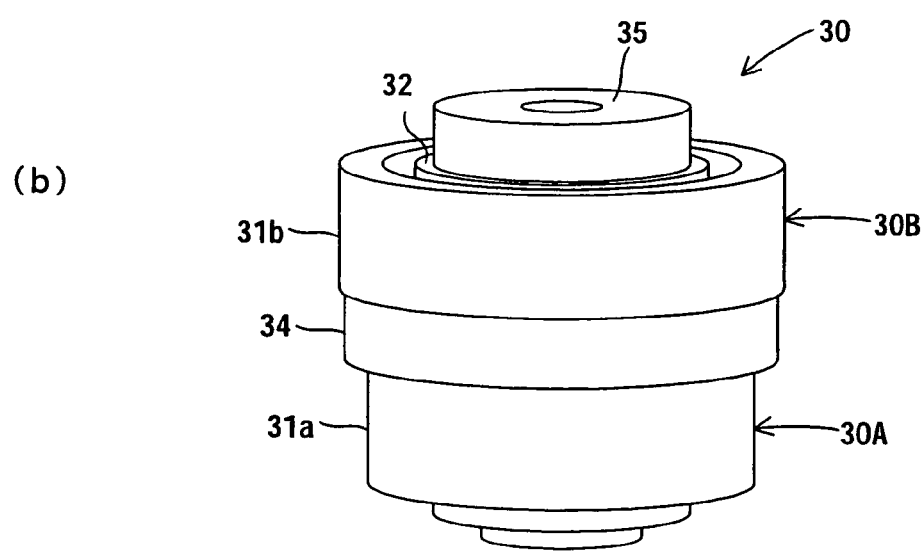
Figure 2:
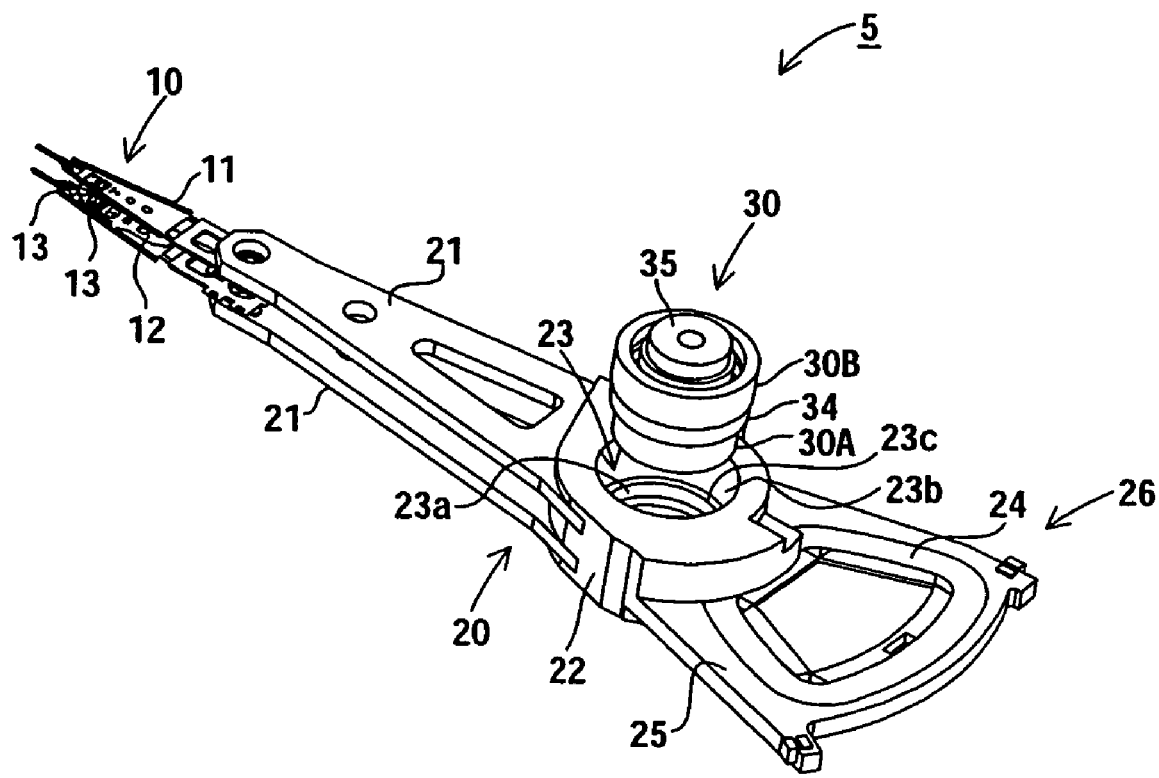
FIG. 2 is an overall perspective view showing an actuator head suspension assembly of a rotating disk storage device.
Figure 3:
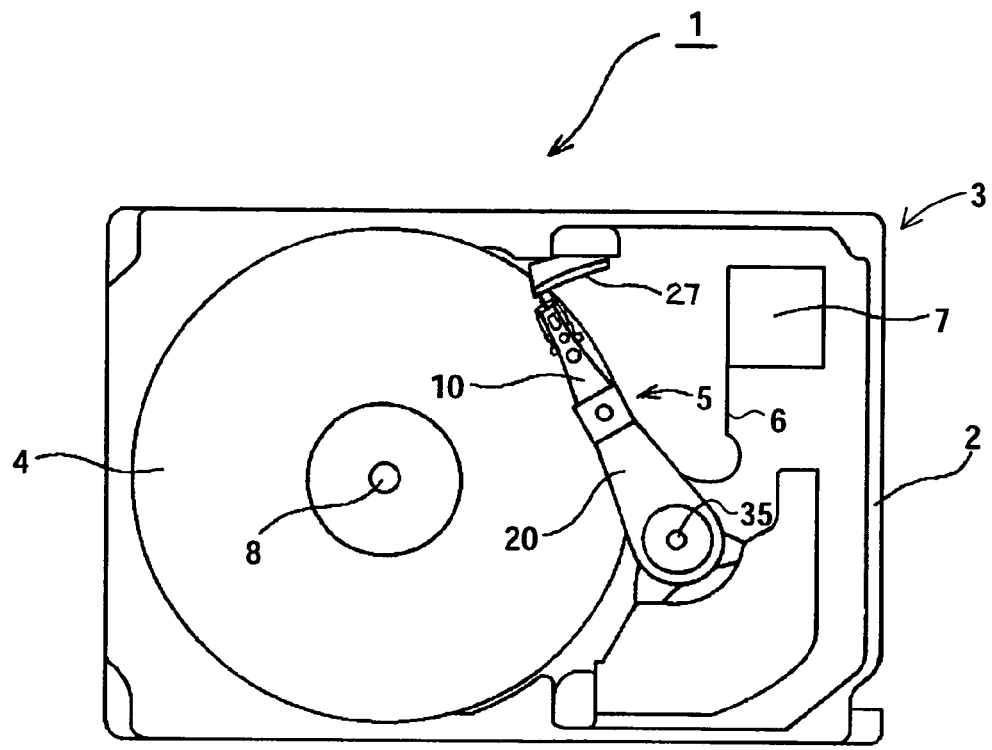
FIG. 3 is a plan view showing the construction of a magnetic disk device as a rotating disk storage device.

A rotating disk storage device and a pivot bearing assembly according to embodiments of the present invention will be described with reference to the accompanying drawings. FIGS. 1($a$) and 1($b$) are views showing a principal portion of a magnetic disk device according to one embodiment of the present invention. FIGS. 1($a$) and 1($b$) show a pivot bearing assembly in relation to a carriage. FIG. 1($a$) is a cross-sectional view and FIG. 1($b$) is an overall perspective view showing a pivot bearing assembly. FIG. 2 is an overall perspective view showing the relationship between the pivot bearing assembly and an actuator head suspension assembly. FIG. 3 is a plan view showing the construction of the magnetic disk device according to the present embodiment.

The rotating disk storage device or the magnetic disk device 1 in accordance with an embodiment of the present invention is generally constructed as shown in FIG. 3. Specifically, referring to FIG. 3, there is a disk enclosure 2 formed into an enclosed space with a base 3 and a cover (not shown) that covers an upper portion of the base 3. There are housed in this disk enclosure 2 a magnetic disk stack 4 that is the rotating disk recording medium, a spindle motor (not shown), and an actuator head suspension assembly (hereinafter referred to as an AHSA) 5. A flexible cable 6 and an external connection terminal 7 mounted thereon are built into the base 3. A circuit board (not shown) provided on an outside of the disk enclosure 2 is connected to the external connection terminal 7.

The magnetic disk stack 4 is formed as follows. Specifically, one or a plurality of disks is secured onto an outer periphery of a spindle shaft 8 of the spindle motor arranged in a standing condition on the base 3. A recording surface is formed on a front surface and a back surface of the disk. If there are a number of disks involved, these disks are laminated one on top of another on a spindle hub (not shown) with a predetermined gap provided therebetween. The disks can thereby spin as an integrated body around the spindle shaft 8.

The AHSA 5 includes a head suspension assembly (hereinafter referred to as an HSA) 10 and an actuator assembly 20. Referring now to FIG. 2, the HSA 10 includes a load beam 11 and a flexure 12. The flexure 12 supports a slider 13 mounted with a head. The slider 13 receives an ascending force caused by an air flow from a front surface of the magnetic disk stack 4, flying while maintaining a predetermined gap. The head may read and write data, or performs only a single task of reading or writing data.

The actuator assembly 20 is constructed, for example, as shown in FIG. 2. Specifically, the actuator assembly 20 includes two actuator arms 21 and a carriage 22. The actuator arms 21 support the HSA 10 on respective leading ends thereof. The carriage 22 serves as a bearing portion for a pivot shaft 35 fixed at a predetermined position in the base 3. The two actuator arms 21 are secured to the carriage 22 so that a predetermined amount of gap is provided between the two actuator arms 21. A pivot opening 23 is provided at a front portion of the carriage 22. A pivot bearing assembly 30 pivotably mounted in the pivot shaft 35 is inserted into the pivot opening 23. A coil support 25 for supporting a voice coil 24 is formed in a rear of the carriage 22. The coil support 25 and the voice coil 24 form, together with an upper yoke and a lower yoke, a voice coil motor (VCM) 26.

Two holes 23a, 23b having different hole diameters from each other are formed in the pivot opening 23 of the carriage 22 so as to form a step 23c at an adjoining portion of the two holes.

The pivot bearing assembly 30 inserted in the pivot opening 23 includes the following components. Specifically, referring to FIGS. 1(a) and 1(b), the components include a first roller ball bearing 30A and a second roller ball bearing 30B. The first and the second roller ball bearing 30A, 30B include an outer race 31a (31b) and an inner race 32 with a plurality of balls 33 as rolling elements interposed therebetween. The first roller ball bearing 30A is formed by the outer race 31a of an outer diameter such as to be an interference fit or a clearance fit on the hole 23a having a smaller hole diameter in the pivot opening 23. The second roller ball bearing 30B is formed by the outer race 31b of an outer diameter such as to be an interference fit or a clearance fit on the hole 23b having a greater hole diameter in the pivot opening 23. The inner races 32 of the first and the second roller ball bearing 30A, 30B are of the same inner diameter. This allows the inner races 32 to be an interference fit or a clearance fit on the pivot shaft 35 having a straight shape.

The first and the second roller ball bearing 30A, 30B are fitted over the pivot shaft 35 so as to be disposed in tandem. A spacer 34 of a cylindrical shape is interposed between the first and the second roller ball bearing 30A, 30B. The spacer 34 is fitted over the pivot shaft 35 with play provided therebetween. The spacer 34 can therefore be disposed so as to abut only on the outer races 31a, 31b of the first and the second roller ball bearing 30A, 30B.

The pivot bearing assembly 30 as arranged as described in the foregoing has the following effect. Specifically, an adequate preload can be given to the first and the second roller ball bearing 30A, 30B even without using a sleeve for accurately fitting in the pivot opening in the actuator head suspension assembly which was conventionally necessary. More specifically, the first roller ball bearing 30A is first fitted over the pivot shaft 35. The inner race 32 of the first roller ball bearing 30A is bonded to a lower portion of the pivot shaft 35 with an adhesive. The spacer 34 is then fitted onto the pivot shaft 35, to which the first roller ball bearing 30A has been secured. The spacer 34 is thereby placed on top of the first roller ball bearing 30A. The second roller ball bearing 30B is fitted over the pivot shaft 35 and placed on top of the spacer 34. The inner race 32 of the second roller ball bearing 30B is secured to the pivot shaft 35 with pressure being applied from the side of a top surface of the inner race 32 of the second roller ball bearing 30B. The spacer 34 is disposed, at this time, so as to abut only on the outer races 31a, 31b of the first and the second roller ball bearing 30A, 30B. Then, fixed position preload is achieved, in which relative positions of the first and the second roller ball bearing 30A, 30B are fixed with the two outer races 31a, 31b being integrated by the spacer 34. This results in contact points between the outer races 31a, 31b and the inner race 32, and the balls 33, receiving a compression force at all times. Stiffness of each of the first and the second roller ball bearing 30A, 30B can thereby be enhanced and bearing clearance can thereby be minimized.

The pivot bearing assembly 30 has a simple arrangement, in which the first roller ball bearing 30A, the spacer 34, and the second roller ball bearing 30B are mounted, in that order, onto the pivot shaft 35. A deep groove ball bearing is preferable for the first and the second roller ball bearing 30A, 30B. The deep groove ball bearing features an arcuate, deep-grooved raceway both for the inner and outer races, in which balls are housed by way of a retainer. A conductive, commercially available bearing manufactured to accuracies equivalent to JIS standards can be employed. This permits application to an interference fit or a clearance fit. The use of the deep groove ball bearing also contributes to a reduced production cost. It should be understood that the deep groove ball bearing is not the only type applicable to the roller ball bearing. Rather, any type of roller ball bearings can be used as long as the type is a radial ball bearing.

In many of actuator assemblies, such as the actuator assembly 20 having the pivot bearing assembly 30 mounted in the pivot opening 23 as described in the foregoing, the following approaches are taken to build lightweight bodies at low cost. Specifically, a conductive material, such as aluminum or the like, is used for the two actuator arms 21, 21 and a nonconductive material, such as plastic or the like, is used for the carriage 22. It goes without saying that a conductive material may be used for both of these parts. If the carriage 22 is formed by a nonconductive material, the hole 23a having a smaller hole diameter is provided in the actuator arm 21 located on the lower side (on the side of the base 3), with the step 23c formed on an upper surface. If the conductive actuator arm 21 located on the lower side (on the side of the base 3) functions as the step 23c, the following condition develops. Specifically, if each of the parts making up the pivot bearing assembly 30 is conductive, a surface of the spacer 34 made of a conductive material, such as stainless steel or the like, comes into contact with the step 23c of the actuator arm 21 when the pivot bearing assembly 30 is mounted in the pivot opening 23. This provides electric conductivity between the actuator arm 21 located on the lower side and the pivot bearing assembly 30. Obtaining electric conductivity across the lower actuator arm 21 and the pivot bearing assembly 30 prevents static electricity from being produced at a leading end of the HSA 10. If electric conductivity is not obtained across the lower actuator arm 21 and the pivot bearing assembly 30, the AHSA 5 can be easily charged. As a result, there will be a potential difference between the head of the HSA 10 or the actuator arm 21 and the pivot bearing assembly 30. The electric conductivity obtained across the lower actuator arm 21 and the pivot bearing assembly 30 permits the use of a low-cost, nonconductive adhesive for the type of adhesive used to bond the following locations. Specifically, the adhesive for bonding the hole 23a having a smaller hole diameter in the pivot opening 23 to the outer periphery of the outer race 31a of the first roller ball bearing 30A of the pivot bearing assembly 30; and the adhesive for bonding the hole 23b having a larger hole diameter in the pivot opening 23 to the outer periphery of the outer race 31b of the second roller ball bearing 30B of the pivot bearing assembly 30. Electric conductivity across the lower actuator arm 21 and the pivot bearing assembly 30 can therefore be obtained without involving any increase in production cost.

As the low-cost, nonconductive adhesive used for securing the pivot bearing assembly 30 in the pivot opening 23 in the actuator assembly 20, use of the UV adhesive by the brand name of 326LVUV manufactured by LOCTITE in combination with the curing promoter by the brand name of LP-98B is recommended though not required. Adding the curing promoter to the UV adhesive helps the UV adhesive cure. It might be noted that the UV adhesive by the brand name of 326LVUV can cure itself.

A magnetic disk device 1 also includes a ramp provided near the magnetic disk stack 4 (see FIG. 3). When the magnetic disk stack 4 is to be brought to a stop from spinning, the ramp 27 provides a merge lip (not shown) disposed at a leading end of the HSA 10 with a sliding surface, while retracting the head.

Prior to assembling of the magnetic disk device 1 having the arrangements as described in the foregoing, the pivot bearing assembly 30 is previously assembled by using the assembly procedures described in the foregoing.

To assemble the magnetic disk device 1, the following steps are performed. Specifically, the spindle motor is assembled in an inside region of the base 3 of the disk enclosure 2 integrating the spindle shaft 8 and the like. The magnetic disk stack 4 is then screwed to a rotor of the spindle motor. The lower yoke is provided for the base 3.

The actuator assembly 20 for supporting the HSA 10 at the leading end thereof is next mounted to the pivot shaft 35. To perform this step, the pivot bearing assembly 30 is mounted in the pivot opening 23 in the carriage 22 forming the actuator assembly 20. With the hole 23b having a larger hole diameter in the pivot opening 23 in the carriage 22 located on the upper side, a lower end portion of the pivot shaft 35 of the pivot bearing assembly 30 is secured to a predetermined position in the base 3 using a screw or the like. The AHSA 5 is thus secured to the base 3. When the pivot bearing assembly 30 is inserted in the pivot opening 23 in the carriage 22, the spacer 34 is brought into contact with the step 23c formed in the pivot opening 23. The step 23c then serves as the reference position for positioning the AHSA 5 in the height direction relative to the base 3. This allows for accurately positioning the AHSA 5 in the height direction without using any positioning jig. For example, as shown in FIG. 1(a), a lower end portion 35a of the pivot shaft 35 to be in face contact with the base 3 and an upper surface 21a of the actuator arm 21 located on the lower side of the actuator assembly 20 may be used as the reference surfaces for positioning.

The HSA 10 supported by the actuator assembly 20 is pivotally moved about the pivot shaft 35. The magnetic head mounted on the slider 13 is thereby moved to the corresponding magnetic disk stack 4. A magnetic head side end portion not shown of the flexible cable 6 is attached to a side surface of the carriage 22. A head wire from the magnetic head and a coil wire from the voice coil 24 of the carriage 22 are connected, respectively, to the magnetic head side end portion. The other end portion of the flexible cable 6 is connected through a connector to the external connection terminal 7. The following procedures are performed as the final steps. Specifically, the upper yoke is disposed upward the lower yoke. The rest of other necessary parts are assembled to the base 3. Referring now to FIG. 1(a), a cover 9 is attached to the base 3. An upper end portion of the pivot shaft 35 of the pivot bearing assembly 30 is then secured to a predetermined position of the cover 9 using a screw or the like. This completes the assembly procedures. The pivot shaft 35 is secured to the base 3 and the cover 9 of the disk enclosure 2. This prevents the pivot shaft 35 from being tilted to adversely affect pivotal motion of the AHSA 5.

In the magnetic disk device 1 in accordance with one embodiment of the present invention, as described in the foregoing, the actuator assembly 20 included in the AHSA 5 has the two actuator arms 21, 21 laminated together and secured with a predetermined gap provided therebetween. The invention is not limited to this configuration only. Rather, the actuator assembly may have a single actuator arm secured thereto; or, the actuator assembly may even have three or more actuator arms laminated together and secured with a predetermined gap provided therebetween, as long as the following condition is met. The condition is, specifically, that the pivot bearing assembly 30 can be mounted, with electric conductivity secured, in the pivot opening 23 provided in the carriage 22 so as to form the step 23c at the adjoining portion of the two holes 23a and 23b having different hole diameters from each other.

Figure 4:
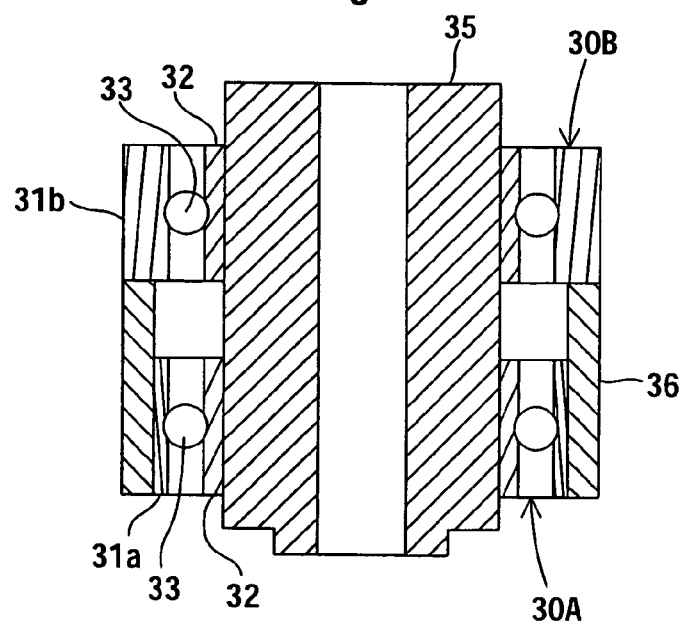
FIG. 4 is a cross-sectional view showing another embodiment of a pivot bearing assembly forming a principal component of the rotating disk storage device.

Further, in the magnetic disk device 1 as described in the foregoing, the spacer 34 of the pivot bearing assembly 30 is interposed between the first roller ball bearing 30A and the second roller ball bearing 30B. The invention is not limited to this configuration only. Rather, the following configuration is also possible, since the configuration provides fixed position preload. Referring to FIG. 4, a spacer 36 is secured to an outer periphery of the outer race 31a having a smaller outer diameter of the first roller ball bearing 30A. A leading end of this spacer 36 is then brought in contact with a surface of the outer race 31b having a larger outer diameter of the second roller ball bearing 30B. Then the fixed position preload is provided, in which the positions of the roller ball bearings are fixed with the outer races 31a and 31b integrated by the spacer 36. This allows adequate preload to be applied to the first and the second roller ball bearing 30A, 30B.

Further, in the magnetic disk device 1 as described in the foregoing, the pivot bearing assembly 30 gives the first and the second roller ball bearing 30A, 30B an adequate preload through fixed position preload. The invention is not limited to this approach only. Rather, a constant pressure preload may be employed using a spring to impose a constant preload, thereby applying an adequate preload to the first and the second roller ball bearing 30A, 30B. In this case, a constant pressure preload can be achieved by using a spring to give pressure at all times from an upper surface side of the inner race 32 of the second roller ball bearing 30B.

Figure 5:
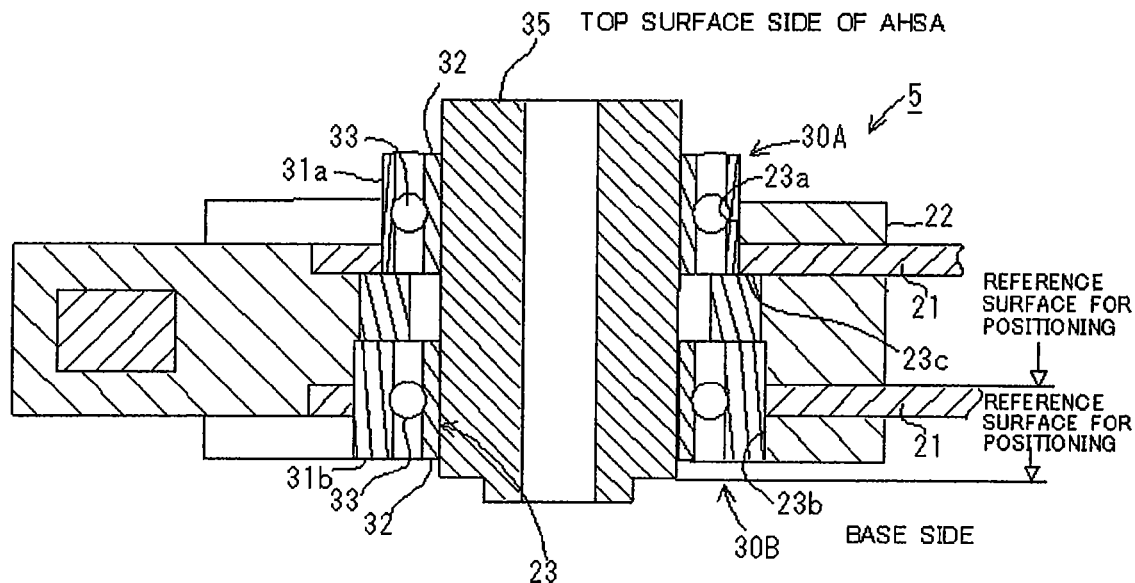
FIG. 5 is a cross-sectional view showing another embodiment of an actuator head suspension assembly forming a principal component of the rotating disk storage device.
Figure 6:
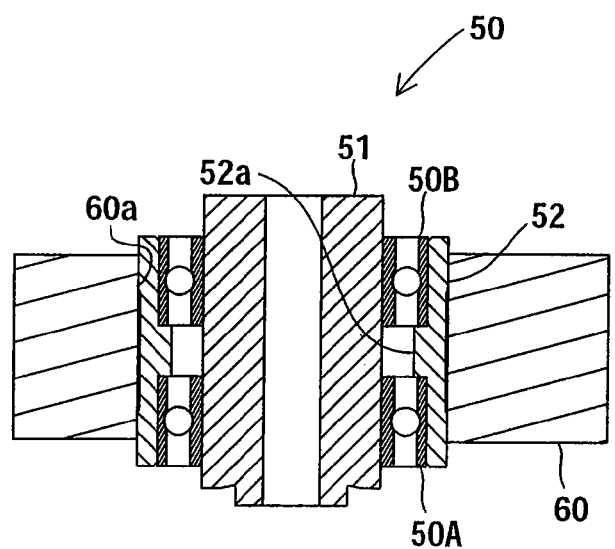
FIG. 6 is a cross-sectional view showing the construction of a conventional pivot bearing assembly.

Further, in the magnetic disk device 1 as described in the foregoing, the hole 23a having a smaller hole diameter in the pivot opening 23 in the carriage 22 included in the actuator assembly 20 is provided on the lower side (on the side of the base 3) of the carriage 22. The invention is not limited to this arrangement only. Rather, as shown in FIG. 5, the hole 23b having a larger hole diameter in the pivot opening 23 in the carriage 22 included in the actuator assembly 20 may be provided on the lower side (on the side of the base 3) of the carriage 22. Even in this arrangement, the step 23c formed by the two holes 23a, 23b having different hole diameters from each other at the adjoining portion thereof can serve as the reference for positioning the AHSA 5 in the height direction relative to the base 3. This permits accurate positioning in the height direction without having to use any positioning jig. The top surface of the AHSA 5, as the term is used herein, refers to a portion positioned upward when the AHSA 5 is assembled into the base 3.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A rotating disk storage device, comprising:
   a rotating disk recording medium;
   an actuator head suspension assembly mounted with a head and including a pivot opening that has a step formed by holes of different hole diameters at an adjoining portion thereof, the head pivotally moving about a pivot shaft so as to move over a surface of the rotating disk recording medium; and
   a pivot bearing assembly including a first roller bearing and a second roller bearing, each of the first and the second roller bearings including an outer race and an inner race with rolling elements interposed therebetween; the first and the second roller bearing being disposed so that, when the first and the second roller bearing are inserted in the pivot opening in the actuator head suspension assembly, the outer race of one roller bearing fits into a hole with the greater hole diameter of the pivot opening, while the outer race of the other roller bearing fits into a hole with the smaller hole diameter of the pivot opening; there being interposed a spacer between the first and the second roller bearing, the spacer being disposed so as to abut on the outer race only of each of the first and the second roller bearings and the spacer abutting on the step in the pivot opening; and the pivot shaft being inserted in the inner race of each of the first and the second roller bearings disposed inside the pivot opening,
   wherein the pivot shaft is secured to a base and the hole having the smaller hole diameter is provided on a side of the base in the pivot opening.

2. The rotating disk storage device according to claim 1, wherein the actuator head suspension assembly includes a head suspension assembly mounted with the head and an actuator assembly for supporting the head suspension assembly; and
   wherein the pivot opening penetrates a carriage of the actuator assembly.

3. The rotating disk storage device according to claim 2, wherein the actuator assembly includes at least two actuator arms, to which the head suspension assembly is mounted.

4. The rotating disk storage device according to claim 3, wherein the hole with the smaller hole diameter for forming the step in the pivot opening is provided in at least one of the actuator arms.

5. The rotating disk storage device according to claim 1, wherein the spacer is secured to an outer periphery of the outer race of the roller bearing having a smaller outer diameter.

6. The rotating disk storage device according to claim 1, wherein the inner races of the first and the second roller bearings have the same inner diameter.

7. The rotating disk storage device according to claim 1, wherein the pivot shaft is secured to the base and the hole having the larger hole diameter is provided on the side of the base in the pivot opening.

8. The rotating disk storage device according to claim 1, wherein the first and the second roller bearings comprise deep groove ball bearings.

9. A rotating disk storage device, comprising:
   a disk enclosure including a base and a cover;
   a rotating disk recording medium rotatably supported by the base and driven by a spindle motor;
   an actuator head suspension assembly mounted with a head and including a pivot opening that includes a step formed by holes of different hole diameters at an adjoining portion thereof, the head pivotally moving about a pivot shaft so as to move over a surface of the rotating disk recording medium; and
   a pivot bearing assembly including a first conductive roller bearing and a second conductive roller bearing, each of the first and the second roller bearings including an outer race and an inner race with rolling elements interposed therebetween; the first and the second roller bearings being disposed so that, when the first and the second roller bearings are inserted in the pivot opening in the actuator head suspension assembly, the outer race of one roller bearing fits into a hole with the greater hole diameter of the pivot opening, while the outer race of the other roller bearing fits into a hole with the smaller hole diameter of the pivot opening; there being interposed a conductive spacer between the first and the second roller bearings, the spacer being disposed so as to abut on the step in the pivot opening, and the pivot shaft being inserted in the inner race of each of the first and the second roller bearings disposed inside the pivot opening, the pivot shaft thereby establishing electric conductivity relative to the disk enclosure;
   wherein an outer periphery of the pivot bearing assembly and an inner periphery of the pivot opening are bonded together using an adhesive,
   wherein the pivot shaft is secured to a base and the hole having the smaller hole diameter is provided on a side of the base in the pivot opening.

10. The rotating disk storage device according to claim 9, wherein the actuator head suspension assembly includes a head suspension assembly mounted with the head and an actuator assembly for supporting the head suspension assembly;
    wherein the actuator assembly includes a nonconductive carriage for securing an actuator arm and a coil support;
    wherein the hole with the smaller hole diameter for forming the step in the pivot opening is provided in the actuator arm; and
    wherein the spacer abuts on the step formed by the actuator arm.

11. The rotating disk storage device according to claim 10, wherein a plurality of the actuator arms is laminated one on top of another and secured to the carriage.

12. The rotating disk storage device according to claim 9, wherein the pivot shaft is secured to the base and the cover of the disk enclosure.

13. The rotating disk storage device according to claim 9, wherein the adhesive is a nonconductive adhesive.

14. A pivot bearing assembly, comprising:
    a first roller bearing and a second roller bearing, each of the first and the second roller bearings including an outer race and an inner race with rolling elements interposed therebetween; and a pivot shaft, in which the first and the second roller bearing are fitted so as to be disposed in tandem and to which each of the inner races of the first and the second roller bearings is secured;

wherein a spacer is interposed between the first and the second roller bearing and the spacer abuts on only each of the outer races of the first and the second roller bearings, wherein the outer races of the first and the second roller bearings have different outer diameters from each other, wherein the pivot shaft is secured to a base and the second roller bearing having the smaller diameter is provided on a side of the base.

15. The pivot bearing assembly according to claim 14, wherein the spacer is secured to an outer periphery of the outer race of either one of the first and the second roller bearings.

16. The pivot bearing assembly according to claim 14, wherein the spacer is secured to an outer periphery of the outer race of the roller bearing having a smaller outer diameter.

17. The pivot bearing assembly according to claim 14, wherein the inner races of the first and the second roller bearings have the same inner diameter.

18. The pivot bearing assembly according to claim 14, wherein the first and the second roller bearings comprise deep groove ball bearings.

* * * * *

UNITED STATES PATENT AND TRADEMARK OFFICE
CERTIFICATE OF CORRECTION

| | |
|---|---|
| PATENT NO. | : 7,428,125 B2 |
| APPLICATION NO. | : 11/090350 |
| DATED | : September 23, 2008 |
| INVENTOR(S) | : Takaaki Deguchi et al. |

It is certified that error appears in the above-identified patent and that said Letters Patent is hereby corrected as shown below:

Title page, item 56 References Cited, Foreign Patent Documents, please add JP 05-149353.

Signed and Sealed this

Eighth Day of September, 2009

David J. Kappos
*Director of the United States Patent and Trademark Office*